Figure 1:
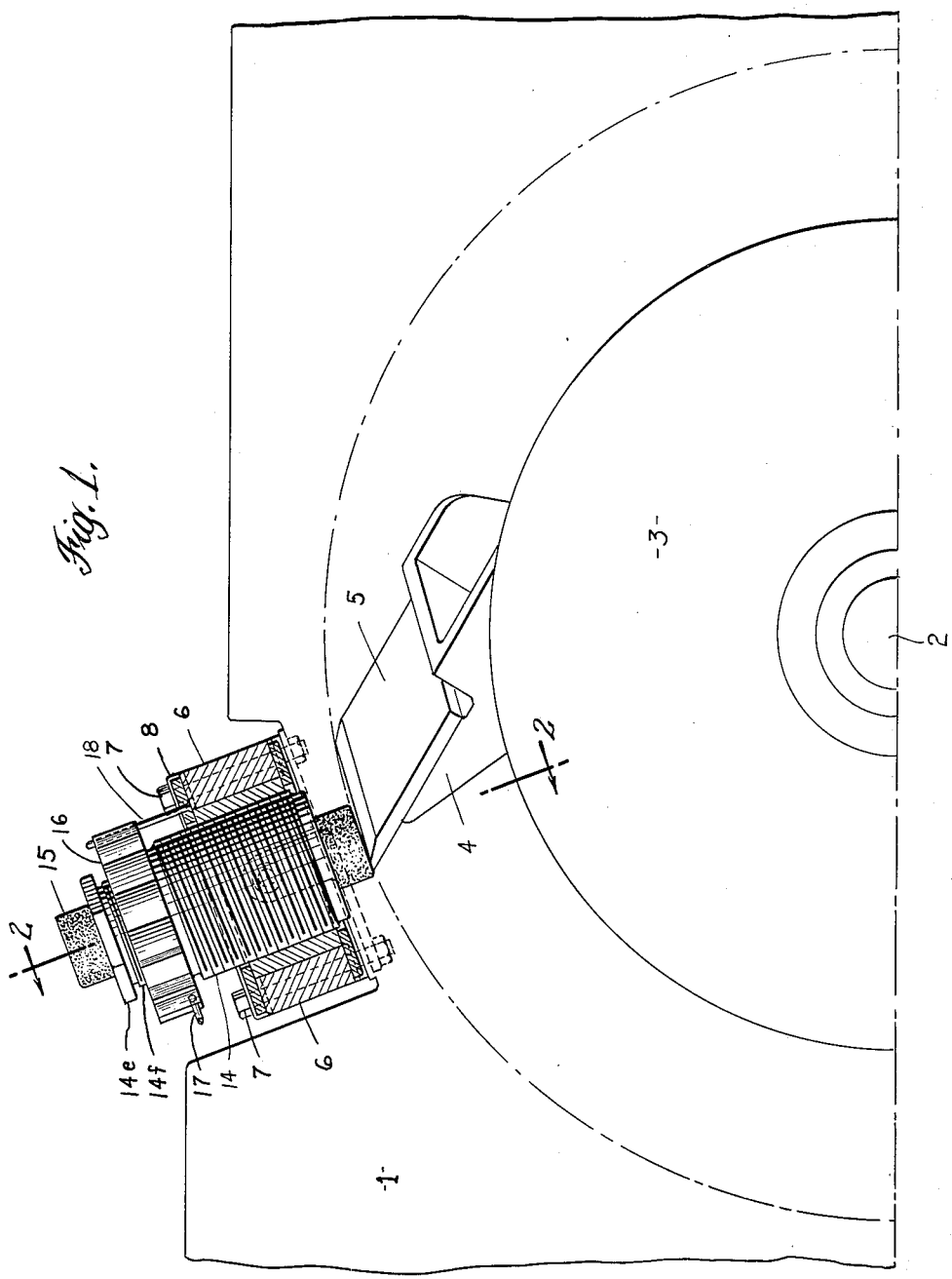

Feb. 21, 1956  J. R. WEST ET AL  2,735,248
SHARPENING ATTACHMENT FOR ROTARY CUTTER HEADS
Filed Dec. 30, 1952  2 Sheets-Sheet 1

INVENTORS:
James R. West
James L. Stackhouse
By Richard E. Babcock Jr.
ATTORNEY

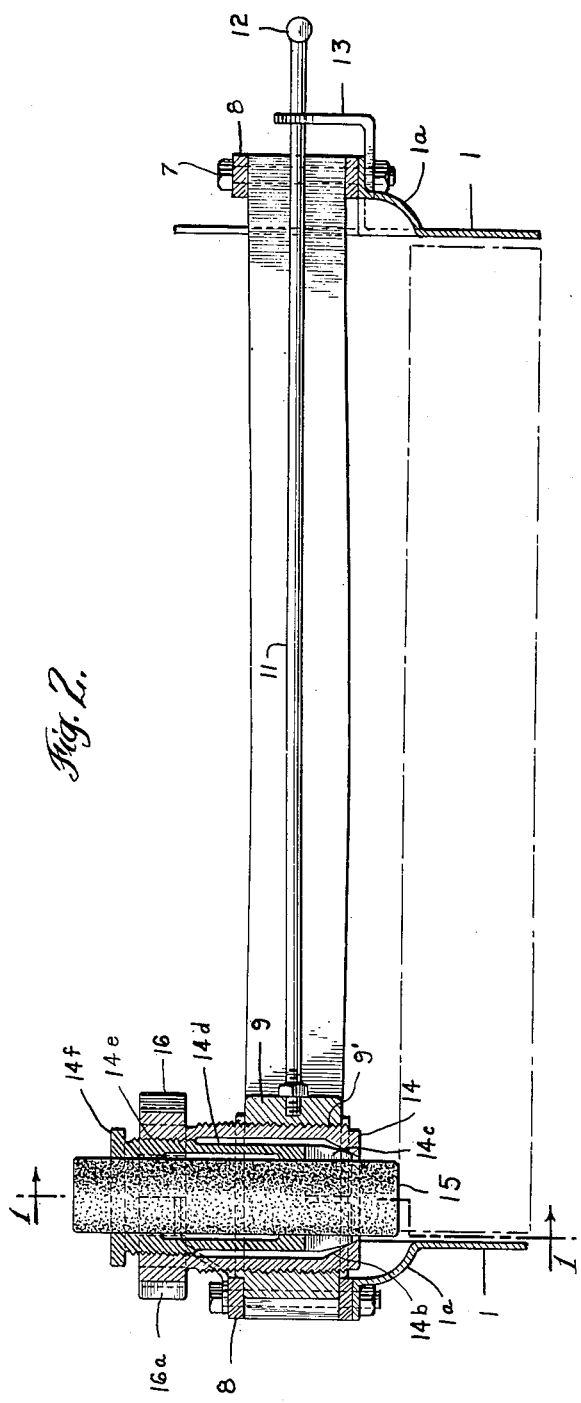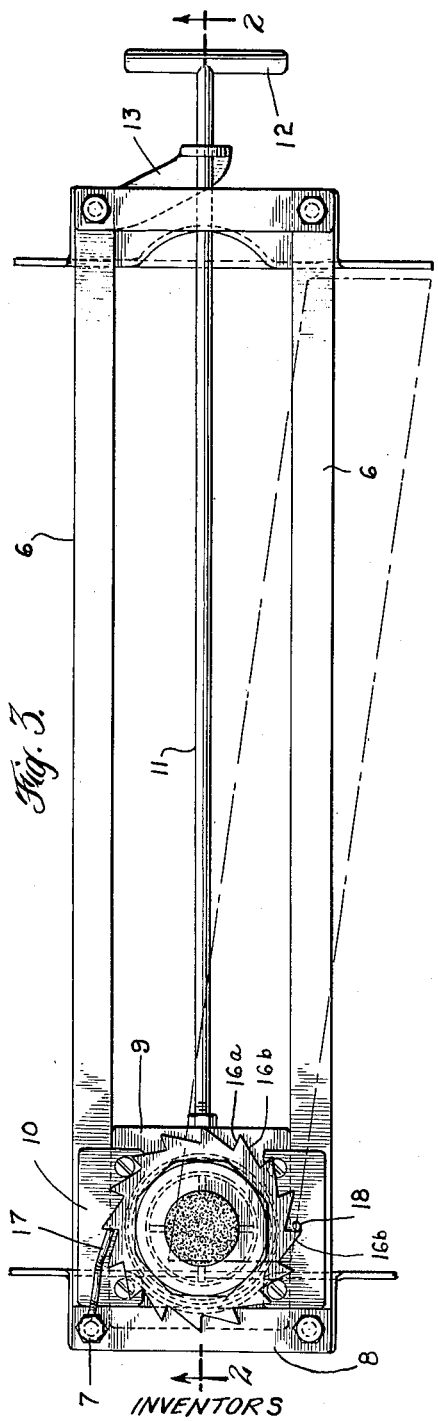

_2,735,248_
Patented Feb. 21, 1956

United States Patent Office 2,735,248

SHARPENING ATTACHMENT FOR ROTARY CUTTER HEADS

James R. West, New Holland, and James L. Stackhouse, Lancaster, Pa., assignors, by mesne assignments, to Sperry Rand Corporation, New Holland, Pa., a corporation of Delaware Application December 30, 1952, Serial No. 328,661

4 Claims. (Cl. 51—246)

This invention relates to a sharpening attachment for rotary cutter heads of the reel or cylinder type such as are customarily employed in ensilage cutters, lawn mowers and the like.

More particularly the present invention is directed toward a sharpening attachment of the type which is guided for reciprocation back and forth in an axial direction with its sharpening element contiguous to the surface generated by the rapidly rotating knives of the cutter head.

In such attachments it is necessary to feed the sharpening stone or element radially toward the rotational axis of the cutter head in order to maintain the stone in proper operative engagement with the knives as the stone is worn away during the sharpening operation. Heretofore it has been customary to provide the reciprocating attachment with manually actuated feed means, however, it has been found difficult to properly effect the manual adjustment due to the reciprocating motion of the attachment, and also, due to the inherent difficulty of effecting the frequent adjustments or feed movements in the small increments such as are desired to constantly take up the wear on the stone and to maintain it in proper operative engagement with the cutter head.

With the foregoing considerations in mind, it is the primary object of the invention to provide a sharpening attachment in which the sharpening stone or element is adjusted automatically and in frequent small increments radially to a cutter head as an incident to its reciprocating traversing movement across the rotating cutter head.

It is a further object to provide a sharpening attachment adapted for use in combination with a rotary cutter head of the type in which the cutter knives are provided with straight edges inclined to the rotational axis of the cutter head to generate a hyperboloid surface of revolution, the sharpening attachment being capable of sharpening the said cutting edges during rotation of the cutter head.

Other incidental objects and advantages will be apparent from the hereinafter following detailed description, together with the accompanying drawings, in which:

Figure 1 represents a sectional view on the line 1—1 of Figure 2, looking in the direction of the arrows and showing the invention as it may appear when operatively applied to an ensilage cutter and its cutter head being illustrated diagrammatically and fragmentarily;

Figure 2, a section on the line 2—2 of Figure 1 looking in the direction of the arrows, and Figure 3, a plan view of the structure shown in Figure 2.

Referring now in detail to the accompanying drawings, the invention is illustrated as operatively applied to an ensilage cutter of more or less conventional construction, of which there is illustrated only the portions which cooperate with the invention. In the construction shown, the reference character 1—1 respectfully designates the opposite sides of the usual cutter and blower housing between which, on a shaft 2, is rotatably supported the cutter head or reel having axially spaced end discs such as 3 in Figure 1 between which are carried one or more knife supports 4, each of which carries a knife or cutter element 5 for rotation with the cutter head.

In the illustration shown, the knives 5 are arranged in a manner generally similar to that disclosed in the Webb Patent 7,711 of October 8, 1850, with the cutting edges of the reel supported knives 5 straight and inclined relative to their axis of rotation 2 to cooperate with a stationary bed knife or ledger plate (not shown) in exerting a shearing cut on the material processed by the cutter head.

The cutter head sharpening device of the invention comprises a guide track which may comprise the opposed parallel bars 6—6 having their opposite ends bolted to the respective housing sides 1 as by bolts 7. The opposed ends of these bars 6—6 are preferably interconnected by bars or straps 8 through which the bolts 7 are passed and which serve to maintain these bars rigidly in their desired parallel relation.

A carriage 9 guided for reciprocation along the track is supported between the bars 6 thereof by means of laterally projecting wings 10 which are secured to the carriage 9 both above and below the track bars 6 for sliding engagement therewith. The carriage 9 may be manually reciprocated by means of a rod 11 threaded or otherwise rigidly connected to the carriage 9 and terminating in an operating handle 12, the projecting free end of said rod 11 preferably being slidably supported and guided through a bracket 13 supported on one of the bolts 7. It will be noted that the rod 11 of course extends between and parallel to the track bars 6, and the bars 6 extend in an axially parallel direction to the cutter head.

In addition to fixedly securing the track bars in their parallel assembled relation as above mentioned, the connecting straps 8 in the present preferred embodiment are utilized as stops for abutment with the carriage 9 at the opposite ends of its stroke to thus limit its reciprocating movement within the desired range.

A tool holder or chuck 14 supported by the carriage 9 for movement therewith is threadedly connected to the carriage for rotation about an axis transverse to the carriage movement and substantially radially to the axis 2 about which the cutter head rotates. This is accomplished in the preferred embodiment by providing the carriage 9 with a threaded bore 9' extending therethrough transversely to the reciprocation of the carriage. The tool holder in this instance embodies a substantially conventional chuck structure having an externally threaded chuck element threaded through the bore 9', the element 14 being in the form of a hollow sleeve which is interiorly formed at its lower end in usual manner to provide inclined surfaces 14b for wedging the jaws 14c of the inner chuck element 14d into gripping engagement with a cylindrical sharpening tool or stone 15 of abrasive material which is coaxially disposed in the chuck. The inner chuck element 14c is threaded into the outer chuck element 14 at its upper end as at 14e (see Figure 2). Exteriorly of the outer chuck element 14, the upper end of the element 14c may be formed with an integral nut or portion 14f of octagonal or other noncircular cross-section, whereby it may be gripped and rotated with a usual wrench or other tool. Thus it will be seen that the sharpening element may be inserted in the chuck and manually maintained in any desired position of axial adjustment therein while the inner chuck element 14c is rotated to cause its jaw portions 14c to grip against and retain the element 15 fixedly in said position.

Intermittent rotation of the chuck 14, in uniform small increments, as may be desired to feed the sharpening element 15 downwardly to accommodate for the wear thereon incident to its sharpening function, may be produced by means comprising a rotary drive wheel or element, in the form of a ratchet wheel 16 coaxially fixed on and preferably integral with the chuck member 14. Cooperating with this ratchet wheel 16 is a drive detent 17 which is fixedly supported relative to the track 6—6, preferably being fixed on one of the stop or stop members 8 by means of one of the bolts 7 extending therethrough. It will be seen that this driving detent 17 has its free end positioned for abutment with the substantially radial faces 16a of the ratchet teeth of the wheel 16, the arrangement being such that the detent 17 will rotate the wheel 16 and chuck member 14 for the circumferential extent of one ratchet tooth, from the time of engagement of said ratchet tooth by the detent 17 up till the time the slide 9 abuts against the adjacent stops 8.

The detent 17 will normally be of laterally resilient construction in order that it may be laterally deflected by engagement of its side with the adjacent ratchet tooth of the wheel 16 as the latter is retracted away from the detent 17. In order to prevent the driving detent 17 from causing a retrogressive rotative movement of the ratchet wheel as same is retracted away from the detent 17, there is provided a holding pawl or detent 18 which is fixed to one of the side wings or plates 10 of the slide 9. This holding detent 18 is similarly laterally deflectible responsive to engagement thereof by the inclined cam faces 16b of the ratchet teeth to permit same to move past (in a clockwise direction as seen in Figure 3) one at a time, as the ratchet wheel 16 is rotated by engagement with the driving detent 17.

Although the sharpening attachment or device of the invention may be adapted for use with various types of cutter heads or reels, the particular cutter head shown for purposes of exemplification employs straight edged knives 5 which are disposed with their cutting edges inclined to the rotational axis 2 of the cutter head. Thus as seen in Figure 1, the medial portion of the cutting edge of each knife 5 rotates about a somewhat lesser radius than the opposite ends of said cutting edge. Because of this, it has been found that during revolution of the cutter head, the cutting edges of its several knives 5 will not generate a true cylinder, but instead will generate a hyperboloid. Accordingly, in order to accommodate for this, the track members 6 in the preferred embodiment of the invention are medially bowed toward the axis 2 of the cutting head in a curve substantially corresponding to the hyperboloid surface generated by the knives 5 in rotation, to thus accurately grind the cutting edges of the knives in a straight line.

In the operation of the invention, it will be seen that with the cutter head rotating about its axis 2, the handle 12 may be actuated in obvious manner to reciprocate the carriage 9 and sharpening stone 15 back and forth with the lower end of the stone 15 in operative abrasive engagement with the cutting edges of the knives 5 to sharpen same. In the illustrated embodiment it will be noted that the sides 1 of the cutter housing are locally bulged outwardly, as at 1a—1a, to permit reciprocation of the stone 15 for the full length of the knives 5. During each reciprocation, as the carriage 9 moves into engagement with the stops 8, at the left hand end of its stroke as seen in Figure 2, the driving detent 17 will operatively engage one of the teeth of the ratchet wheel 16 to partially rotate the chuck 14 and thus cause a slight feeding movement of the stone 15 toward the rotational axis 2 of the cutter head. The successive feed movements of the stone 15 will will be in regular small increments and at frequent intervals as is desired in order to maintain it in proper operative relation with the knives 5. Obviously the circumferential extent of the respective ratchet teeth of the wheel 16 may be proportioned as required to obtain the desired increment of feed, and the location of the stops 8 and detent 17 may be adjusted accordingly.

In this application we have shown and described only the preferred embodiment of our invention, simply by way of setting forth the best mode contemplated by us of carrying out our invention. However, we recognize that our invention is capable of other and different embodiments, and that its several details may be modified in various ways, all without departing from the invention. Accordingly, the drawings and description herein are to be understood as merely illustrative in nature and not as exclusive of other embodiments of the invention.

We claim:

1. A cutter head sharpening device comprising a guide track, a carriage guided for reciprocation along said track and formed with a threaded bore therethrough transversely to the movement of said carriage, means for reciprocating said carriage, stop means associated with said track for limiting the movement of the carriage in one direction, a tool holder supported on said carriage for adjustment transversely to the movement of the said carriage, said tool holder comprising an externally threaded chuck element operatively disposed in said bore, and means interiorly thereof for fixedly coaxially supporting a sharpening element in any of various positions of axial adjustment in said chuck element, rotary means for causing axial adjustment of the tool holder, comprising a ratchet wheel fixed coaxially on the chuck element, a driving detent fixed relatively to said track for engaging and partially rotating said ratchet wheel as the carriage approaches said stop, and a holding detent supported on said carriage in operative association with the ratchet wheel to prevent retrogressive rotation thereof.

2. A cutter head sharpening device comprising a guide track, a carriage guided for movement along said track, stop means at one end of the track for limiting the movement of the carriage, a tool holder supported by said carriage for adjustment transversely to the movement of said carriage, threaded means supported on the carriage for causing such adjustment, a ratchet drive for said threaded means comprising a ratchet wheel fixed coaxially thereon, a driving detent fixed relative to said track for engaging and partially rotating said ratchet wheel as the carriage approaches said stop, and a holding detent supported on said carriage in operative association with the ratchet wheel to prevent retrogressive rotation thereof.

3. A cutter head sharpening device comprising a guide track, a carriage guided for reciprocation along said track and formed with a threaded bore therethrough transversely to the movement of said carriage, an externally threaded chuck operatively disposed in said bore, an abrasive tool held in said chuck, a ratchet wheel fixed coaxially to said chuck, and a driving detent fixedly supported relative to said track to operatively engage and partially rotate said ratchet wheel during each reciprocation thereof.

4. The combination of claim 3 including a holding detent supported on the carriage in operative association with the ratchet wheel to prevent reverse rotary movement thereof.

References Cited in the file of this patent

UNITED STATES PATENTS

| 563,105 | Vivarttas | June 30, 1896 |
| 762,180 | Michou | June 7, 1904 |
| 1,071,580 | Ring | Aug. 26, 1913 |
| 1,760,987 | Klages | June 3, 1930 |
| 1,980,872 | Moul | Nov. 13, 1934 |
| 2,005,551 | MacDonald | June 18, 1935 |
| 2,148,744 | Hall | Feb. 28, 1939 |
| 2,222,580 | Bergfeldt | Nov. 19, 1940 |